April 1, 1969 R. V. HARRIS 3,435,664
METHOD AND APPARATUS FOR EVALUATING THE PROPERTY
OF A LIQUID BY ACOUSTIC MEANS
Filed Jan. 18, 1967
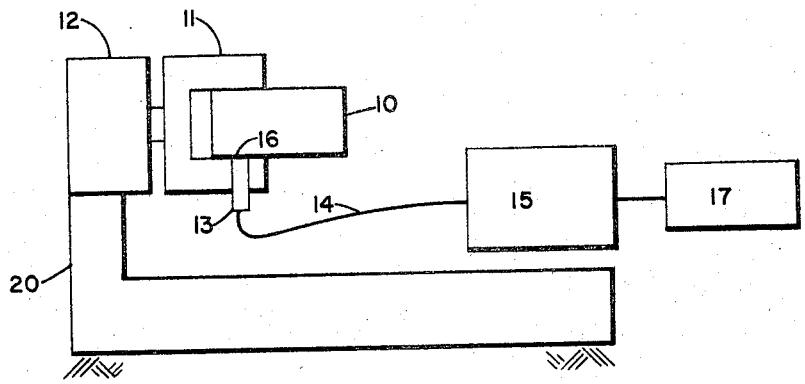
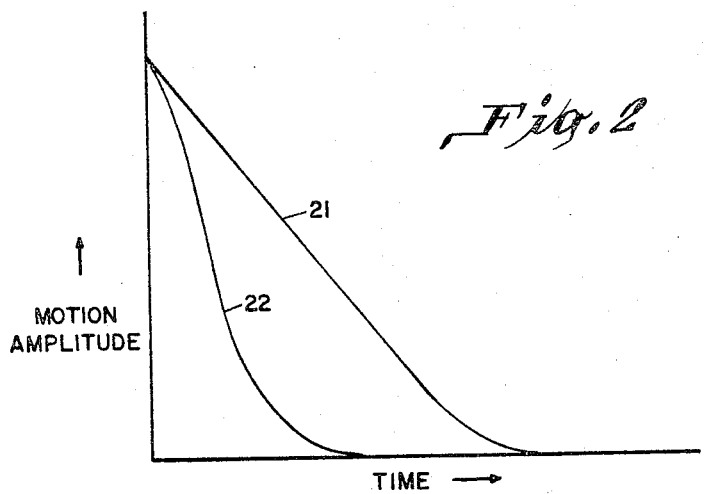
INVENTOR.
ROBERT V. HARRIS
BY
Ervin B. Steinberg United States Patent Office 3,435,664
Patented Apr. 1, 1969

3,435,664
METHOD AND APPARATUS FOR EVALUATING THE PROPERTY OF A LIQUID BY ACOUSTIC MEANS
Robert V. Harris, Darien, Conn., assignor to Branson Instruments, Incorporated, Stamford, Conn., a corporation of Delaware
Filed Jan. 18, 1967, Ser. No. 610,196
Int. Cl. G01n 11/02
U.S. Cl. 73—54    10 Claims

ABSTRACT OF THE DISCLOSURE

A method and apparatus for evaluating the property of a liquid, such as viscosity, in a sealed container by providing temporary relative motion between the container and the liquid and denoting by acoustic means coupled to the outside of the container the decay of the relative motion versus time.

---

This invention refers to a method and apparatus for evaluating the property of a liquid in a container and, more specifically, concerns a method and arrangement for evaluating the property of a liquid in a sealed container, such as a metal can and the like.

One of the most difficult tasks in the packaging industry is evaluating the property of a liquid in a sealed container. For instance, containers without labels become intermixed and need to be sorted, typically oils of different viscosity. Another problem concerns the shelf life of a liquid, i.e. removing liquid filled containers from storage shelves when the liquid is no longer suitable for sale. In a typical example, canned milk sours and cans so affected need to be removed from storage racks. As milk sours its viscosity changes and hence by investigating the viscosity of the liquid contained in the sealed container, certain deductions can be made whether the milk is still good or not.

In accordance with the principle of this invention, the liquid in the container is set into motion relative to the container and acoustic means are provided to monitor the decay of such motion as a function of time, the characteristics of the decay curve being dependent, for instance, on the viscosity of the liquid. Therefore, liquids differing in viscosity or weight can be sorted while sealed in the container.

The present invention, therefore, provides a method for evaluating liquids sealed in a container in a very simple and inexpensive manner without disturbing the container or its contents.

One of the principal objects of this invention is the provision of a new and improved method and apparatus for evaluating the property of a liqiud in a container.

Another important object of this invention is the provision of a method and apparatus for evaluating the property of a liquid in a container for sorting and shelf life determining purposes.

Another important object of this invention is the provision of the method and apparatus for evaluating the property of a liquid in a container by acoustic means without affecting either the container or the liquid contained therein.

Further and still other objects of this invention will be more clearly apparent by reference to the following description when taken in conjunction with the accompanying drawing in which:

FIGURE 1 is a schematic illustration of the apparatus for practicing the invention, and FIGURE 2 is a diagram explaining the operation of the apparatus.

Referring now to the figures and FIGURE 1 in particular, numeral 10 identifies a container, such as a sealed quart can containing milk. The can is retained in a chuck 11 which is attached to a means 12 adapted to impart a sudden rotational force to the can. In a typical embodiment, the item 12 comprises a rotary electromagnetic solenoid adapted to turn the chuck 90° or 180°. In an alternative embodiment, a rotatable device operated by a ratchet and adapted to impart a quick rotation to the can 10 is used. The entire arrangement is supported by a frame 20.

The imparting of a rotational motion upon the container 10 causes the liquid confined therein to be set in rotation and when the can is held still immediately after imparting such rotation, the liquid by virtue of its inertia continues to rotate, being slowed down as time progresses by gravity and frictional contact with the inner container wall. An acoustic device 13 is coupled for contact with the container 10 at the location 16 and provides via a conductor 14 a signal to the electronic unit 15 which for its output may include a loudspeaker, a meter and a plotter 17.

While the acoustic sensing means 13 in a simple embodiment may comprise a microphone which picks up noise responsive to the relative motion between the liquid and the container, in a preferred embodiment it comprises an ultrasonic pulse transmitting and receiving means which employs the Doppler frequency shift principle.

Typically, the device is similar to the one described in "Science," dated Aug. 25, 1961, Volume 134, Number 3478, pages 564, 565, entitled "Blood Flow Measured by Doppler Frequency Shift of Back-Scattered Ultrasound." The operation of such a Doppler device may be described briefly as follows:

Two piezoelectric crystals are positioned in the probe 13 and oriented so that they aim toward a point within the liquid of the container 10. A sound beam of ultrasonic frequency (5 megacycles per second) generated from one crystal passes through the container wall at the location 16 and reaches the liquid. Foreign particles, such as small bubbles of air or other impurities provide interfaces, thereby causing some of the sound energy in the beam to be scattered, however a small fraction reaches the other crystal in the probe 13. If the liquid in the container is stationary, the frequency of sound at the receiver crystal is precisely the same as the transmitter frequency. When the liquid is in motion, the frequency of the back-scattered sound is altered by the Doppler shift and the frequency of the reflected signal, determined by the frequency meter associated with the unit 15 is related to the instantaneous flow velocity of the liquid in container 10. The unit 15 aside from the electrical pulse circuits and receiver circuits coupled to the respective crystals includes also a meter or a loudspeaker, or most suitably the plotter 17 for providing a plot of the output signal versus time, depicting graphically the decay of the motion of the liquid. For further explanations of the Doppler effect as used in ultrasonics reference is made to the book "Ultrasonic Engineering" by Julian R. Frederick, John Wiley & Sons, Inc., New York, N.Y.; Library of Congress Card No. 65–14257, pp. 198–201, "Uses of Ultrasonics in Measurement and Control."

Generally, as has been found a liquid having a high value of viscosity requires a shorter period of time to slow down and come to a standstill against the stationary wall of the container than a liquid of the same characteristics but having a low viscosity. This relation is evident more clearly from FIGURE 2 which depicts the decay of the speed of the relative motion of the liquid versus time for liquids whose viscosity varies. Curve 21 indicates a low viscosity liquid whereas curve 22 refers to a liquid having a higher viscosity, the latter showing a shorter period of time until standstill is achieved. It has been noted also that there exists in typical cases a significant change in the slope of the curve (amplitude change vs. time). Rather than the total time required, the slope of the curve may be used also for evaluation. The output signal amplitude is a value responsive to the motion of the liquid as provided by the measuring circuit. It will be apparent that the absolute value of the output amplitude depends on the gain of the electrical system and the amount of gas or particles dispersed in the liquid and causing back-scattering. The major concern, all other things being equal, is the motion responsive decay curve, time or slope, or both of the liquid relative to the container.

It is possible, therefore, to distinguish between various liquids by a comparative test, using one or more standardized samples. In experiments carried out, fresh milk sealed in a container and having a low viscosity moves for a longer period of time relative to the stopped container, than milk which has soured and exhibits therefore a much higher viscosity.

Similarly, it is possible to distinguish between liquids having different viscosities, such as intermixed cans or bottles.

It will be apparent that the above method and apparatus is eminently suited for testing sealed liquids in order to evaluate their uniformity, freshness, suitability for sale and the like.

While there has been described a preferred embodiment of my invention, it will be apparent to those skilled in the art that various changes and modifications may be made without deviating from the broad principle and intent of my invention.

What is claimed is:

1. A method for evaluating the property of a liquid in a container comprising the steps of:
    providing temporary relative motion between the liquid and container, and
    acoustically monitoring the decay of the relative motion between the liquid and container.

2. A method for evaluating the property of a liquid in a sealed container comprising the steps of:
    imparting a rotational force to the container whereby to set the liquid into motion;
    stopping the motion of the container while the liquid is continuing to rotate relative to the wall of the container, and
    sensing by acoustic means coupled to the container wall the decay of motion of the liquid relative to the container wall as a function of time.

3. A method for evaluating the property of a liquid in a sealed container comprising the steps of:
    imparting a force to the container to set the liquid into motion;
    stopping the motion of the container while said liquid is continuing to move relative to the wall of the container;
    sensing by acoustic means coupled to the container wall the decay of motion of the liquid relative to the container wall, and
    plotting the decay of motion of said liquid versus time.

4. An apparatus for evaluating the property of a liquid in a container comprising:
    means for imparting motion to a liquid filled container for providing temporary relative motion between the liquid and the container;
    acoustic monitoring means coupled to the wall of the container for providing signals responsive to the relative motion between the liquid and the container wall, whereby the decay of said relative motion as a function of time is indicative of the property of the liquid in said container.

5. An apparatus as set forth in claim 4 wherein said acoustic monitoring means comprises ultrasonic pulse transmitting and receiving equipment for determining the Doppler frequency shift responsive to the motion of the liquid relative to the container.

6. An apparatus as set forth in claim 4 and including plotting means coupled to said monitoring means for providing a plot of the amplitude of relative motion versus time.

7. A method for evaluating the property of a liquid in a sealed container comprising the steps:
    imparting momentary motion to the container whereby to cause relative motion between the container and liquid;
    transmitting a beam of ultrasonic frequency energy from the outside of the container to the liquid and monitoring the receipt of reflected energy at the outside of the container;
    determining the Doppler frequency shift between the transmitted and the received energy, and
    monitoring the frequency shift versus time whereby to obtain a measure of the decay of the relative motion between the container and the liquid.

8. A method for evaluating the property of a liquid in a sealed cylindrical container comprising the steps of:
    imparting a momentary rotational force to the container whereby to set the liquid into motion;
    quickly stopping the motion of the container causing the liquid in the container to continue to rotate relative to the wall of the container, and
    sensing by acoustic energy transmitting and receiving means coupled to the outside container wall the decay of motion of the liquid relative to the container wall as a function of time.

9. An apparatus for evaluating the property of a liquid in a container comprising:
    means for imparting a momentary accelerative motion to a liquid filled normally stationary container for providing temporary relative motion between the liquid and the container, and
    acoustic monitoring means coupled to the wall of the container for providing signals responsive to the relative motion between the liquid and the container wall, whereby the decay of said relative motion as a function of time is indicative of the property of the liquid in said container.

10. An apparatus for evaluating the property of a liquid in a cylindrical container comprising:
    means for imparting a momentary rotational motion to the liquid filled container for providing temporary relative motion between the liquid and the container;
    acoustic monitoring means coupled to the wall of the container for providing signals responsive to the relative motion between the liquid and the container wall, whereby the decay of said relative motion as a function of time is indicative of the property of the liquid in said container.

References Cited

UNITED STATES PATENTS

| | | | |
|---|---|---|---|
| 2,839,915 | 6/1958 | Roth et al. | 73—59 |
| 3,040,562 | 6/1962 | Fitzgerald et al. | 73—67.7 X |
| 3,290,922 | 12/1966 | Thompson | 73—52 |

FOREIGN PATENTS 1,037,533   7/1966   Great Britain.

LOUIS R. PRINCE, *Primary Examiner.*

JOSEPH W. ROSKOS, *Assistant Examiner.*

U.S. Cl. X.R.

73—52, 67.8